US012586207B2

(12) United States Patent
Sun et al.

(10) Patent No.: US 12,586,207 B2
(45) Date of Patent: Mar. 24, 2026

(54) SYSTEM AND METHOD FOR AI SEGMENTATION-BASED REGISTRATION FOR MULTI-FRAME PROCESSING

(71) Applicant: Samsung Electronics Co., Ltd., Suwon-si (KR)

(72) Inventors: Yufang Sun, Plano, TX (US); Akira Osamoto, Plano, TX (US); John Seokjun Lee, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 478 days.

(21) Appl. No.: 18/073,376

(22) Filed: Dec. 1, 2022

(65) Prior Publication Data

US 2024/0185431 A1 Jun. 6, 2024

(51) Int. Cl.
G06T 7/194 (2017.01)
G06T 3/18 (2024.01)
(Continued)

(52) U.S. Cl.
CPC ............... G06T 7/194 (2017.01); G06T 3/18 (2024.01); G06T 7/174 (2017.01); G06T 7/337 (2017.01);
(Continued)

(58) Field of Classification Search
CPC ..... G06T 7/10–194; G06T 3/18; G06T 7/246; G06T 7/30–38; G06T 3/14;
(Continued)

(56) References Cited

U.S. PATENT DOCUMENTS 9,824,456 B2 * 11/2017 Noga ................... G06T 7/0016
2009/0003708 A1 1/2009 Steinberg et al.
(Continued)

FOREIGN PATENT DOCUMENTS

CN 201810384920 * 4/2018
CN 110163188 A 8/2019
(Continued)

OTHER PUBLICATIONS

International Search Report and Written Opinion of the International Searching Authority dated Aug. 31, 2023 in connection with International Patent Application No. PCT/KR2023/007294, 11 pages.
(Continued)

*Primary Examiner* — Gregory A Morse
*Assistant Examiner* — Stefano Anthony Dardano

(57) ABSTRACT

A method includes obtaining a reference frame from among multiple image frames of a scene. The method also includes generating a segmentation mask using the reference frame, where the segmentation mask contains information for separation of foreground and background in the scene. The method further includes applying the segmentation mask to each of the multiple image frames to generate foreground image frames and background image frames. The method also includes performing multi-frame registration on each of the foreground image frames to generate registered foreground image frames. The method further includes performing multi-frame registration on each of the background image frames to generate registered background image frames. In addition, the method includes combining the registered foreground image frames and the registered background image frames to generate a combined registered multi-frame image of the scene.

20 Claims, 6 Drawing Sheets

(51) Int. Cl.
    *G06T 7/174*       (2017.01)
    *G06T 7/33*        (2017.01)

(52) U.S. Cl.
    CPC ............... *G06T 2207/20084* (2013.01); *G06T 2207/20221* (2013.01)

(58) Field of Classification Search
    CPC ........... G06T 2207/20212–20221; G06T 5/50; G06V 10/75–761; G06V 10/40–62; G06F 18/25
    See application file for complete search history.

(56)             References Cited

U.S. PATENT DOCUMENTS

| | | | |
|---|---|---|---|
| 2010/0046799 | A1 | 2/2010 | Saptharishi et al. |
| 2012/0159290 | A1* | 6/2012 | Pulsipher .................. G06T 7/70 |
| | | | 714/E11.024 |
| 2016/0088287 | A1 | 3/2016 | Sadi et al. |
| 2016/0125245 | A1 | 5/2016 | Saitwal et al. |
| 2018/0096487 | A1 | 4/2018 | Nash et al. |
| 2018/0285676 | A1* | 10/2018 | Han ..................... G06V 30/153 |
| 2020/0074642 | A1* | 3/2020 | Wilson .................... G06T 7/174 |
| 2020/0396370 | A1* | 12/2020 | Zhen .......................... G06T 5/92 |
| 2021/0042941 | A1 | 2/2021 | Zhen et al. |
| 2021/0217145 | A1 | 7/2021 | El-Khamy et al. |
| 2022/0036525 | A1* | 2/2022 | Xin ..................... G06V 10/772 |
| 2022/0044407 | A1* | 2/2022 | Liu ........................... G06T 7/11 |
| 2022/0109838 | A1 | 4/2022 | Guruva reddiar et al. |
| 2022/0408008 | A1* | 12/2022 | Chu .......................... G06T 7/20 |

FOREIGN PATENT DOCUMENTS

| | | | | | |
|---|---|---|---|---|---|
| CN | 111145192 | A | * | 5/2020 | .............. G06T 5/50 |
| CN | 112767295 | A | | 5/2021 | |
| CN | 113112452 | A | * | 7/2021 | .............. G06T 5/50 |
| CN | 113298735 | A | | 8/2021 | |
| CN | 114519753 | A | | 5/2022 | |
| KR | 102053814 | B1 | | 12/2019 | |
| KR | 102427293 | B1 | | 7/2022 | |
| WO | 2022165462 | A1 | | 8/2022 | |

OTHER PUBLICATIONS

Supplementary European Search Report dated Jul. 28, 2025 in connection with European Patent Application No. 23897945.4, 10 pages.

* cited by examiner

SYSTEM AND METHOD FOR AI SEGMENTATION-BASED REGISTRATION FOR MULTI-FRAME PROCESSING

TECHNICAL FIELD

This disclosure relates generally to imaging systems. More specifically, this disclosure relates to a system and method for artificial intelligence (AI) segmentation-based registration for multi-frame processing.

BACKGROUND

Multi-frame processing with artificial intelligence (AI) technology has been used for smartphone camera image processing to improve image quality. In a typical multi-frame process, multiple image frames are aligned via multi-frame registration and processed by multi-frame blending, producing a blended image that can be subjected to one or more post-processing operations. In some cases, the multi-frame registration can be performed by finding an optimal homography that preserves image content and matches the most-related interesting feature points. For different frames, the homography is computed assuming the image plane is at infinity. In multi-frame processing, the quality and accuracy of the multi-frame registration can affect the rest of an image processing pipeline. Thus, if multi-frame registration is not accurate, it can lead to sub-optimal results in the final blended image.

SUMMARY

This disclosure provides a system and method for artificial intelligence (AI) segmentation-based registration for multi-frame processing.

In a first embodiment, a method includes obtaining a reference frame from among multiple image frames of a scene. The method also includes generating a segmentation mask using the reference frame, where the segmentation mask contains information for separation of foreground and background in the scene. The method further includes applying the segmentation mask to each of the multiple image frames to generate foreground image frames and background image frames. The method also includes performing multi-frame registration on each of the foreground image frames to generate registered foreground image frames. The method further includes performing multi-frame registration on each of the background image frames to generate registered background image frames. In addition, the method includes combining the registered foreground image frames and the registered background image frames to generate a combined registered multi-frame image of the scene.

In a second embodiment, an electronic device includes at least one imaging sensor configured to capture multiple image frames of a scene. The electronic device also includes at least one processing device configured to obtain a reference frame from among the multiple image frames and generate a segmentation mask using the reference frame, where the segmentation mask contains information for separation of foreground and background in the scene. The at least one processing device is also configured to apply the segmentation mask to each of the multiple image frames to generate foreground image frames and background image frames. The at least one processing device is further configured to perform multi-frame registration on each of the foreground image frames to generate registered foreground image frames and to perform multi-frame registration on each of the background image frames to generate registered background image frames. In addition, the at least one processing device is configured to combine the registered foreground image frames and the registered background image frames to generate a combined registered multi-frame image of the scene.

In a third embodiment, a non-transitory machine-readable medium contains instructions that when executed cause at least one processor of an electronic device to obtain a reference frame from among multiple image frames of a scene. The medium also contains instructions that when executed cause the at least one processor to generate a segmentation mask using the reference frame, where the segmentation mask contains information for separation of foreground and background in the scene. The medium further contains instructions that when executed cause the at least one processor to apply the segmentation mask to each of the multiple image frames to generate foreground image frames and background image frames. The medium also contains instructions that when executed cause the at least one processor to perform multi-frame registration on each of the foreground image frames to generate registered foreground image frames. The medium further contains instructions that when executed cause the at least one processor to perform multi-frame registration on each of the background image frames to generate registered background image frames. In addition, the medium contains instructions that when executed cause the at least one processor to combine the registered foreground image frames and the registered background image frames to generate a combined registered multi-frame image of the scene.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IOT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
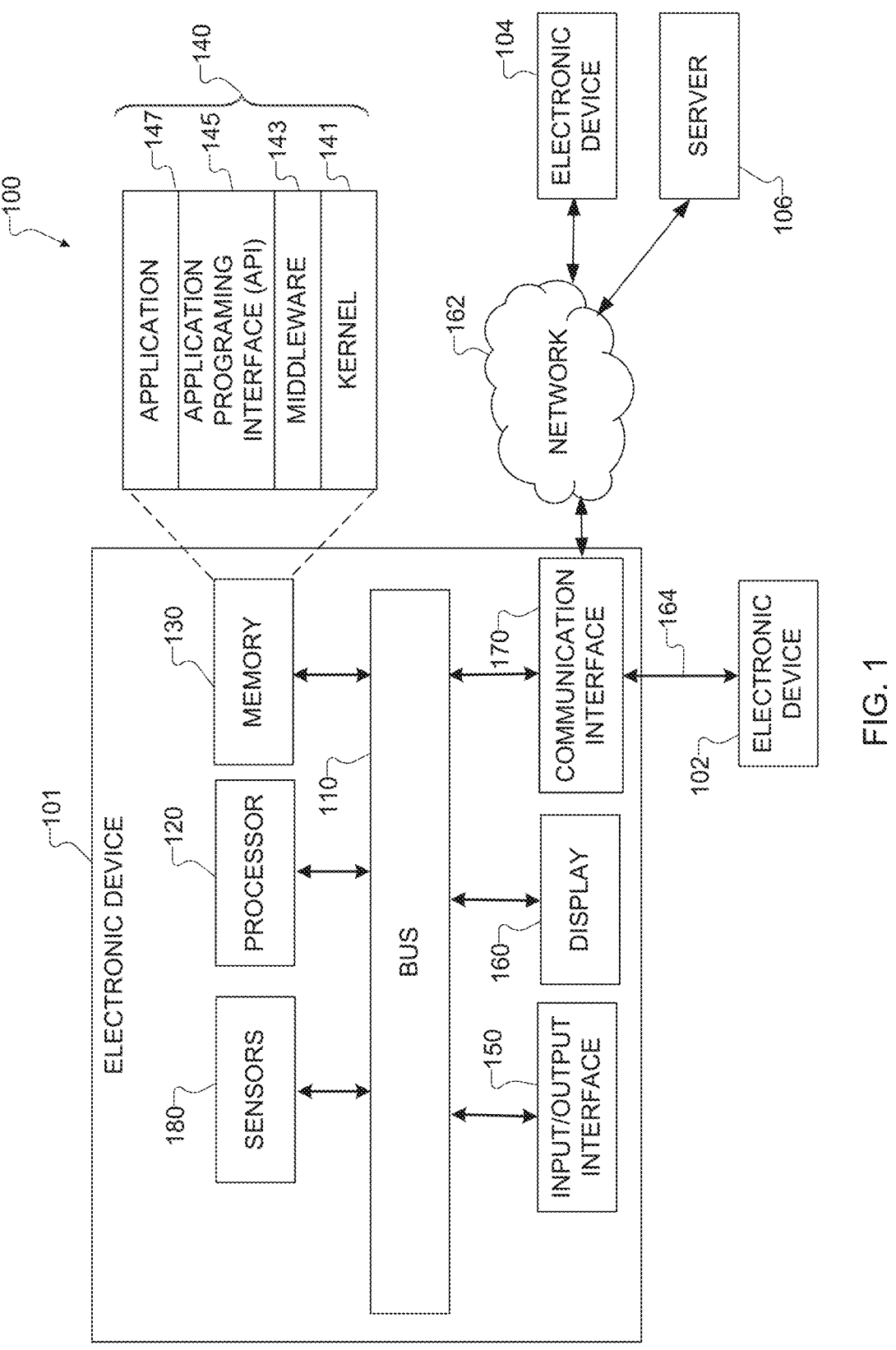
FIG. 1 illustrates an example network configuration including an electronic device according to this disclosure.

FIGS. 1 through 6, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, multi-frame processing with artificial intelligence (AI) technology has been used for smartphone camera image processing to improve image quality. In a typical multi-frame process, multiple image frames are aligned via multi-frame registration and processed by multi-frame blending, producing a blended image that can be subjected to one or more post-processing operations. In some cases, the multi-frame registration can be performed by finding an optimal homography that preserves image content and matches the most-related interesting feature points. For different frames, the homography is computed assuming the image plane is at infinity.

In multi-frame processing, the quality and accuracy of the multi-frame registration can affect the rest of an image processing pipeline. Thus, if multi-frame registration is not accurate, it can lead to sub-optimal results in the final blended image. For example, when the multi-frame registration process aligns multiple image frames, there can be content in both the foreground and the background of a scene. In some conventional techniques, the multi-frame registration operation can prefer the background of a scene if background features dominate the foreground features (or vice versa). In such techniques, if multi-frame registration focuses on aligning the background of a scene, the resulting foreground image may be blurry. Similarly, if multi-frame registration focuses on aligning the foreground of a scene, the resulting background image may be blurry.

This disclosure provides systems and methods for AI segmentation-based registration for multi-frame processing. As described in more detail below, the disclosed systems and methods include an AI segmentation process, which generates a segmentation mask that can be used to separate a foreground and a background in each of multiple image frames. Once the foregrounds and backgrounds are separated to produce foreground image frames and background image frames, multi-frame registration aligns the foreground image frames and the background image frames separately. The foreground aligned image frames and the background aligned image frames are subsequently combined to generate a combined registered multi-frame image of the scene, and multi-frame blending can be performed using the combined registered multi-frame image to generate an output image. Compared to prior techniques, the disclosed embodiments can improve the realism of the final output image. Note that while some of the embodiments discussed below are described in the context of use in consumer electronic devices (such as smartphones), this is merely one example, and it will be understood that the principles of this disclosure may be implemented in any number of other suitable contexts.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform one or more operations for AI segmentation-based registration for multi-frame processing.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for AI segmentation-based registration for multi-frame processing as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for AI segmentation-based registration for multi-frame processing.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
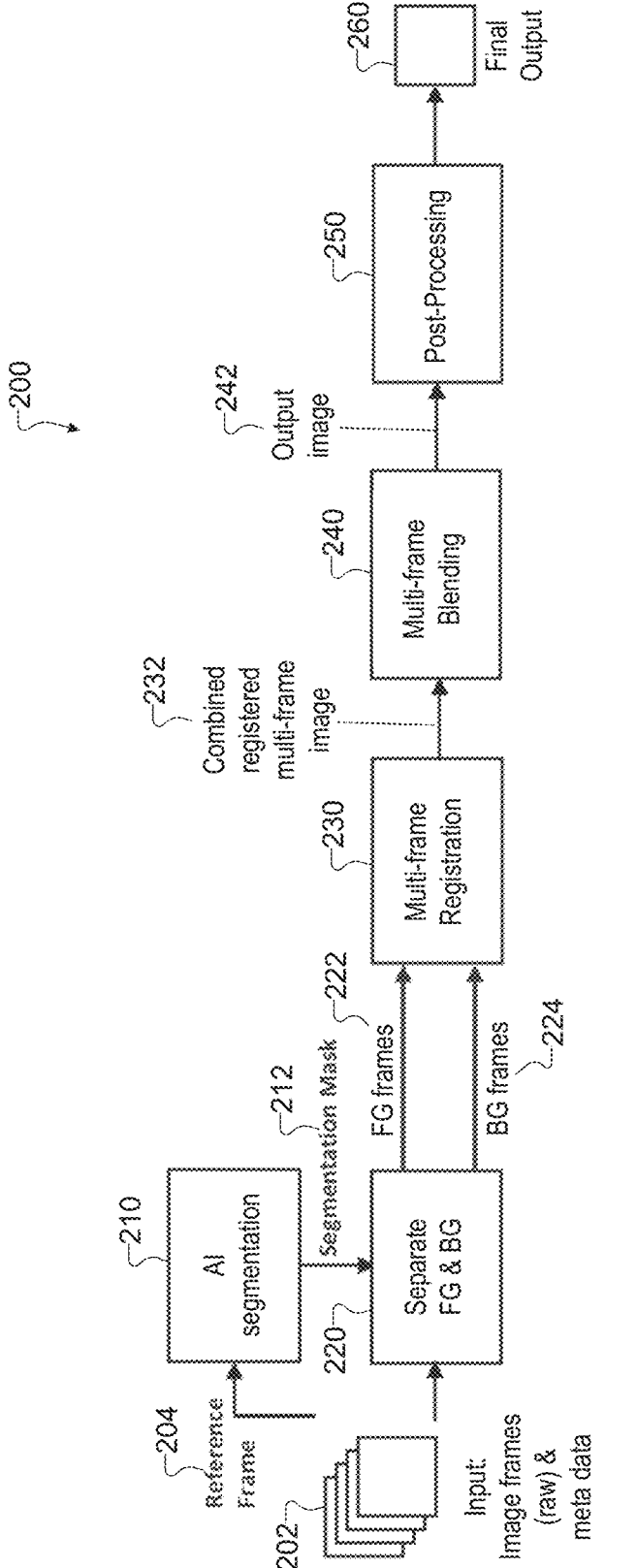
FIG. 2 illustrates an example multi-frame process that uses artificial intelligence (AI) segmentation-based multi-frame registration according to this disclosure.

FIG. 2 illustrates an example multi-frame process 200 that uses AI segmentation-based multi-frame registration according to this disclosure. For ease of explanation, the process 200 is described as being implemented using one or more components of the electronic device 101 described above. However, this is merely one example, and the process 200 could be implemented using any other suitable device(s) and in any other suitable system(s).

As shown in FIG. 2, the electronic device 101 obtains multiple raw image frames 202 of a scene and corresponding metadata for the image frames 202. In some embodiments, the multiple image frames can be captured during a single image collection. For example, the electronic device 101 may include one or more imaging sensors 180, and the image frames 202 may be captured by the imaging sensor(s) 180 of the electronic device 101 sequentially or at the same time. Also, in some embodiments, the image frames 202 have different exposure values (EVs) representing different exposure levels. For instance, one of the image frames 202 can have EV=−3, another of the image frames 202 can have EV=−2, and still other ones of the image frames 202 can have EV=0. Of course, these EV values are merely examples, and other image frames could have other EVs.

Once the electronic device 101 obtains the image frames 202, the electronic device 101 selects one of the image frames 202 as a reference frame 204. In some embodiments, the electronic device 101 selects one of the EV=0 image frames 202 as the reference frame 204. Other image frames 202 (referred to as non-reference or target frames) will subsequently be aligned to the reference frame 204 and blended with the reference frame 204.

After selecting the reference frame 204, the electronic device 101 performs an AI segmentation operation 210 using the reference frame 204 as an input. In the AI segmentation operation 210, the electronic device 101 generates a segmentation mask 212 that includes information that can be used to separate a foreground and a background in each image frame 202. In some embodiments, the segmentation mask 212 is generated as a binary mask based on the reference frame 204, where the mask distinguishes foreground areas of the reference frame 204 from background areas of the reference frame 204. The AI segmentation operation 210 can include the use of any suitable model-based AI image segmentation engine or tool. In some embodiments, the AI image segmentation engine or tool can represent a trained segmentation network having any suitable machine learning-based structure, such as a convolutional neural network, deep learning network, or other architecture.

Once the segmentation mask 212 is generated, the electronic device 101 performs a separation operation 220 using the segmentation mask 212 as an input. In the separation operation 220, the electronic device 101 applies the segmentation mask 212 to the image frames 202 (including the reference frame 204) in order to separate the image frames 202 into foreground image frames 222 and background image frames 224. That is, the electronic device 101 separates each of the image frames 202 into a corresponding foreground image frame 222 and a background image frame 224. The separation operation 220 can include any suitable image separation technique or algorithm using a segmentation mask (including those currently known and those that are developed in the future).

After generating the foreground image frames 222 and the background image frames 224, the electronic device 101 performs a multi-frame registration operation 230 in which the foreground image frames 222 and background image frames 224 are aligned (registered) separately. After that, the aligned (registered) foreground image frames and aligned background image frames are blended together or otherwise combined to generate a combined registered multi-frame image 232 of the scene.

Figure 3:
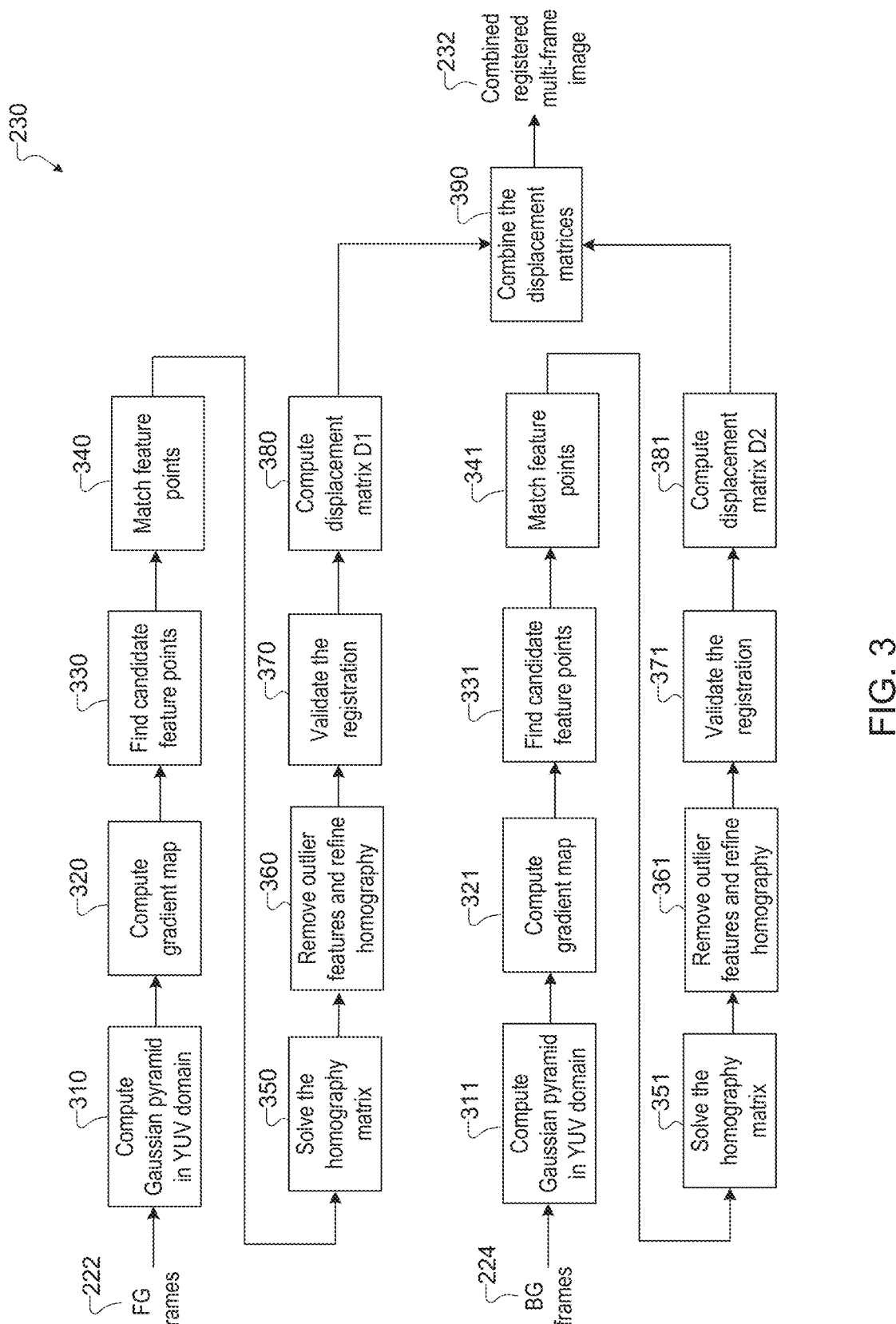
FIG. 3 illustrates additional details of one example of a multi-frame registration operation for the process of FIG. 2 according to this disclosure.

FIG. 3 illustrates additional details of one example of the multi-frame registration operation 230 according to this disclosure. As shown in FIG. 3, the multi-frame registration operation 230 includes separate parallel paths for the foreground image frames 222 and the background image frames 224. That is, operations 310-380 are performed on each of the foreground image frames 222, while operations 311-381 are performed on each of the background image frames 224.

The multi-frame registration operation 230 starts with operations 310-311 in which the electronic device 101 constructs Gaussian pyramids in the luma-chroma (YUV) domain to prepare the foreground image frames 222 and the background image frames 224 for alignment. In operation 310, the electronic device 101 takes each foreground image frame 222, which in some cases may be in the Bayer domain, and converts the foreground image frame 222 into the red-green-blue (RGB) domain. The electronic device 101 also converts the foreground image frame 222 from the RGB domain to the YUV domain. The electronic device 101 can use any suitable image domain conversion technique(s) to convert the foreground image frames 222 to the YUV domain. The electronic device 101 also sub-samples each foreground image frame 222 (such as by a factor of two or another suitable factor) and applies a Gaussian filter to the sub-sampled frame to obtain a blurred image corresponding to the Gaussian pyramid. In operation 311, the electronic device 101 performs the same operations on each background image frame 224.

In operations 320-321, the electronic device 101 computes gradient maps from the blurred images obtained in operations 310-311. For example, in operation 320, the electronic device 101 generates a foreground gradient map by applying a filter (such as a Sobel filter) onto the blurred image produced by the operation 310. Similarly, in operation

321, the electronic device 101 generates a background gradient map by applying a filter onto the blurred image produced by the operation 320. Any suitable technique can be used to compute the gradient maps.

In operations 330-331, the electronic device 101 determines one or more candidate feature points for each of the foreground image frames 222 and background image frames 224. The feature points are selected for facilitating alignment between each foreground image frame 222 and the reference frame 204 or between each background image frame 224 and the reference frame 204. In some embodiments, the electronic device 101 determines feature points based on local minimums and/or maximums across each of the foreground image frames 222 and background image frames 224. The electronic device 101 determines corresponding feature points in the reference frame 204.

In operations 340-341, the electronic device 101 matches feature points of each foreground image frame 222 or background image frame 224 to corresponding feature points of the reference frame 204. That is, the electronic device 101 matches and aligns the feature points between each foreground image frame 222 and the reference frame 204 or between each background image frame 224 and the reference frame 204. For example, in operation 340, the electronic device 101 may divide each foreground image frame 222 into multiple tiles. In some embodiments, each tile can have a size of 16×16 pixels or any other suitable size. The electronic device 101 may also divide the reference frame 204 into corresponding tiles of the same size. For each tile in the reference frame 204 and its related tile in the foreground image frame 222, the electronic device 101 determines the best alignment, such as by finding the minimum cross-correlation coefficient value. Based on the best alignment, the offset between the foreground image frame 222 and the reference frame 204 can be denoted as (u, v). The electronic device 101 can perform this matching for every tile in the reference frame 204 and each of the foreground image frames 222. In operation 341, the electronic device 101 performs the same matching operations for each background image frame 224.

In operations 350-351, the electronic device 101 solves a homography matrix (H) between each foreground image frame 222 and the reference frame 204 or between each background image frame 224 and the reference frame 204 based on the matched feature points. The homography matrix can be determined based on feature pairs, which are defined as the center of each tile of the reference frame 204 and the matching point in each tile in each foreground image frame 222 or background image frame 224. As discussed above, the offset between these two points is (u, v), which is computed during the operations 340-341. The homography matrices computed using all tiles are considered to be initial homography matrices and will be refined.

In operations 360-361, the electronic device 101 refines the initial homography matrices by removing outlier feature points, which are represented by invalid tile pairs. In operation 360, for each foreground image frame 222, the electronic device 101 may apply the corresponding initial homography matrix to the center of each tile of the foreground image frame 222, which results in a new offset (u', v'). The electronic device 101 can also compute the distance between the aligned position determined in operation 340 and the new aligned position using the new offset (u', v') for each tile. If the distance for a given tile is more than a specified threshold amount, the electronic device 101 rejects that tile. Once one or more tiles (if any) have been rejected for a foreground image frame 222, the electronic device 101 recalculates the homography matrix for the foreground image frame 222 using only the valid (not rejected) matching tiles. The electronic device 101 performs the operation 360 for each of the foreground image frames 222. In operation 361, the electronic device 101 performs the same operations for each of the background image frames 224.

In operations 370-371, the electronic device 101 uses the refined homography matrices to validate the registration (the final alignment result) of each foreground image frame 222 and background image frame 224 with respect to the reference frame 204. The validation serves as a final check to determine if that foreground image frame 222 or background image frame 224 is suitable for use in blending. In some embodiments, the electronic device 101 validates each foreground image frame 222 and background image frame 224 by determining the percentage of valid tiles in the foreground image frame 222 or background image frame 224. If the percentage of valid tiles is below a specified threshold value, the foreground image frame 222 or background image frame 224 is considered to be invalid. Invalid aligned frames will not be used in later blending operations.

In operations 380-381, the electronic device 101 computes a displacement matrix for each foreground image frame 222 and background image frame 224. That is, in operation 380, the electronic device 101 computes a displacement matrix D1 for each foreground image frame 222. In operation 381, the electronic device 101 computes a displacement matrix D2 for each background image frame 224. In some embodiments, the electronic device 101 computes the displacement matrices based on the tiles in each foreground image frame 222 and background image frame 224 and the corresponding tiles in the reference frame 204. For example, the electronic device 101 may consider pairs of tiles, where one tile in the pair is from the reference frame 204 and the other tile in the pair is from the foreground image frame 222 or background image frame 224. If the pair of tiles is valid, which means the distance between local matching points and global computed matching points are within certain thresholds, the electronic device 101 uses local matching points (or local motion) to compute the displacement matrix. If the pair of tiles is invalid, which means that the distance between the local matching points and global computed matching points is greater than certain thresholds, the electronic device 101 uses global computed matching points (or global motion) to compute the displacement matrix. The electronic device 101 can use any suitable technique or algorithm to compute each displacement matrix D1 and D2.

Once the displacement matrices D1 and D2 have been computed, the electronic device 101 performs operation 390 to combine the displacement matrices D1 and D2 and compute a final displacement matrix D for the image frames 202. Both the foreground image frames 222 and the background image frames 224 are aligned to the same reference frame 204, so the electronic device 101 uses the segmentation mask 212 of the reference frame 204 to compute the final displacement matrix D. To facilitate the computation, the segmentation mask 212 is resized to the size of the displacement matrix D. In some embodiments, the electronic device 101 computes the final displacement matrix D by taking the displacement value in the foreground area of the displacement matrix D1 and the displacement value in the background area of the displacement matrix D2 to construct the displacement matrix D. In some cases, the displacement matrix D may be determined using the following equation.

$$D = D1 * M' + D2 * (1 - M')$$

Here, M' is the segmentation mask 212 resized to the size of the displacement matrix D. The displacement matrix D is used by the electronic device 101 to generate the combined registered multi-frame image 232 from the registered foreground image frames 222 and the registered background image frames 224.

Figure 4:
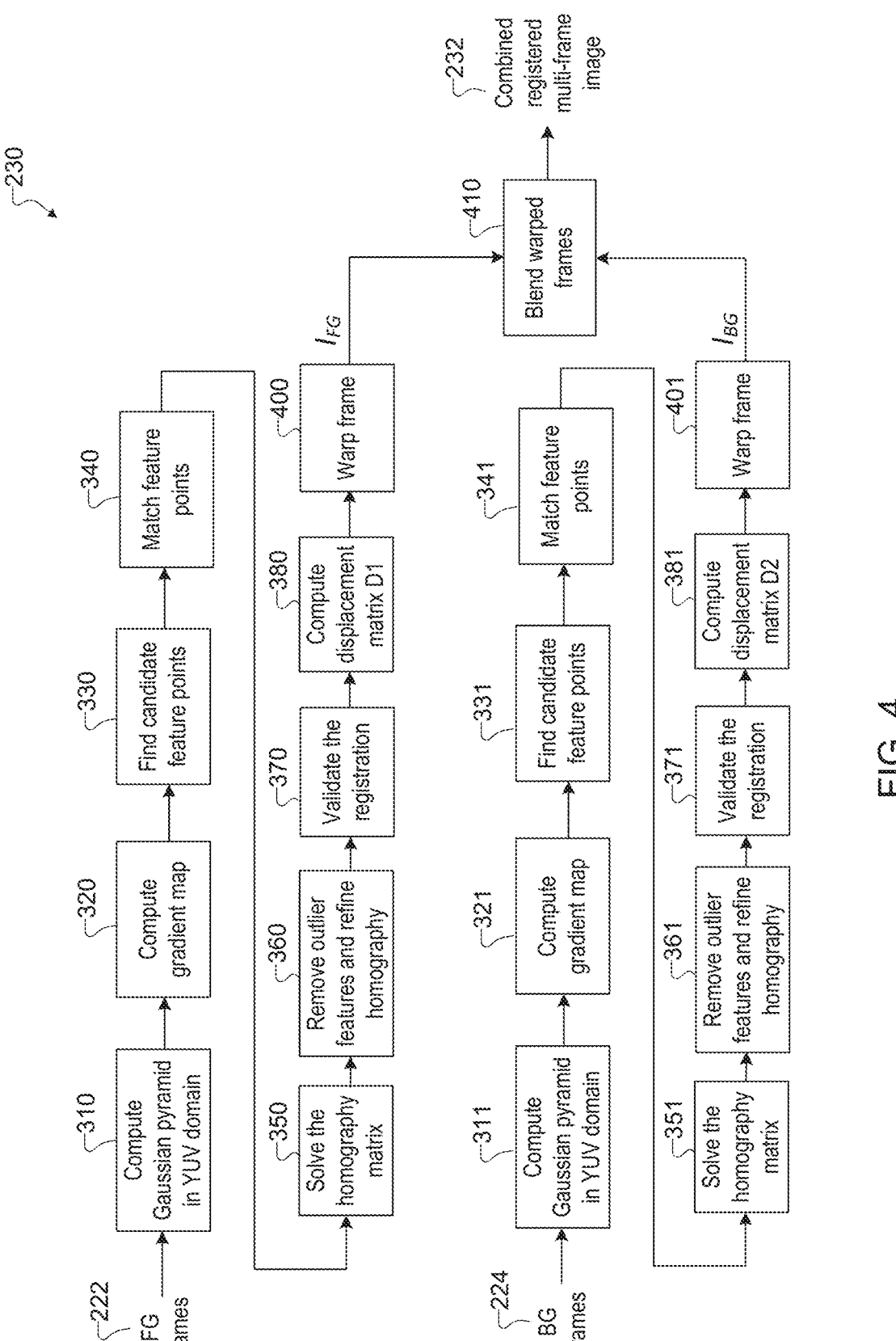
FIG. 4 illustrates additional details of another example of the multi-frame registration operation for the process of FIG. 2 according to this disclosure.

FIG. 4 illustrates additional details of another example of the multi-frame registration operation 230 according to this disclosure. As shown in FIG. 4, the multi-frame registration operation 230 includes operations 310-380 and 311-381, which may be the same as or similar to those discussed above with reference to FIG. 3. As previously discussed in FIG. 3, the electronic device 101 computes the displacement matrix D1 for each foreground image frame 222 in operation 380, and the electronic device 101 computes the displacement matrix D2 for each background image frame 224 in operation 381. Rather than combining the displacement matrices D1 and D2 as in FIG. 3, the multi-frame registration operation 230 in FIG. 4 uses the displacement matrices D1 and D2 in warping operations 400-401.

In the warping operations 400-401, the electronic device 101 uses the displacement matrices D1 and D2 to separately warp the foreground image frames 222 and the background image frames 224. For example, in operation 400, the electronic device 101 uses the displacement matrix D1 to map locations in the foreground image frames 222 to the reference frame 204 to generate warped images $I_{FG}$. Similarly, in operation 401, the electronic device 101 uses the displacement matrix D2 to map locations in the background image frames 224 to the reference frame 204 to generate warped images $I_{BG}$. The electronic device 101 can use any suitable technique or algorithm to generate a warped image using a displacement matrix.

After warping the foreground image frames 222 and the background image frames 224, the electronic device 101 performs a blending operation 410 to blend the warped foreground image frames 222 and the warped background image frames 224 into the combined registered multi-frame image 232. Both the warped foreground image frames 222 and the warped background image frames 224 are aligned to the same reference frame 204, so the electronic device 101 uses the segmentation mask 212 of the reference frame 204 to separate the foreground content and background content for blending. In some embodiments, the electronic device 101 combines the foreground content in the warped foreground image frames 222 and the background content in the warped background image frames 224 to determine the combined registered multi-frame image 232. In some cases, the blending may be defined using the following equation.

$$I = I_{BG}*M + I_{FG}*(1-M)$$

Here, I represents the combined registered multi-frame image 232, and M represents the segmentation mask 212. In some embodiments, the blending operation 410 may result in one or more boundary artifacts in the boundary of the foreground and background areas. In such cases, suitable image processing techniques can be used to reduce the boundary artifacts.

Turning again to FIG. 2, the electronic device 101 obtains the combined registered multi-frame image 232, which is the result of the multi-frame registration operation 230. The electronic device 101 performs a multi-frame blending operation 240 using the combined registered multi-frame image 232. In the multi-frame blending operation 240, the electronic device 101 blends together the individual frames of the combined registered multi-frame image 232 to generate an output image 242 of the scene. The output image 242 represents a blending of the image frames 202. The electronic device 101 can also perform one or more post-processing operations 250 (such as de-mosaic, noise reduction, tone mapping, and the like) to generate a final output image 260.

Although FIGS. 2 through 4 illustrate examples of a multi-frame process 200 that uses AI segmentation-based multi-frame registration and related details, various changes may be made to FIGS. 2 through 4. For example, while shown as a specific sequence of operations, various operations shown in FIGS. 2 through 4 could overlap, occur in parallel, occur in a different order, or occur any number of times (including zero times). Also, the specific operations shown in FIGS. 2 through 4 are examples only, and other techniques could be used to perform each of the operations shown in FIGS. 2 through 4.

Note that the operations and functions shown in FIGS. 2 through 4 can be implemented in an electronic device 101, server 106, or other device in any suitable manner. For example, in some embodiments, the operations and functions shown in FIGS. 2 through 4 can be implemented or supported using one or more software applications or other software instructions that are executed by the processor 120 of the electronic device 101, server 106, or other device. In other embodiments, at least some of the operations and functions shown in FIGS. 2 through 4 can be implemented or supported using dedicated hardware components. In general, the operations and functions shown in FIGS. 2 through 4 can be performed using any suitable hardware or any suitable combination of hardware and software/firmware instructions.

Figure 5B:
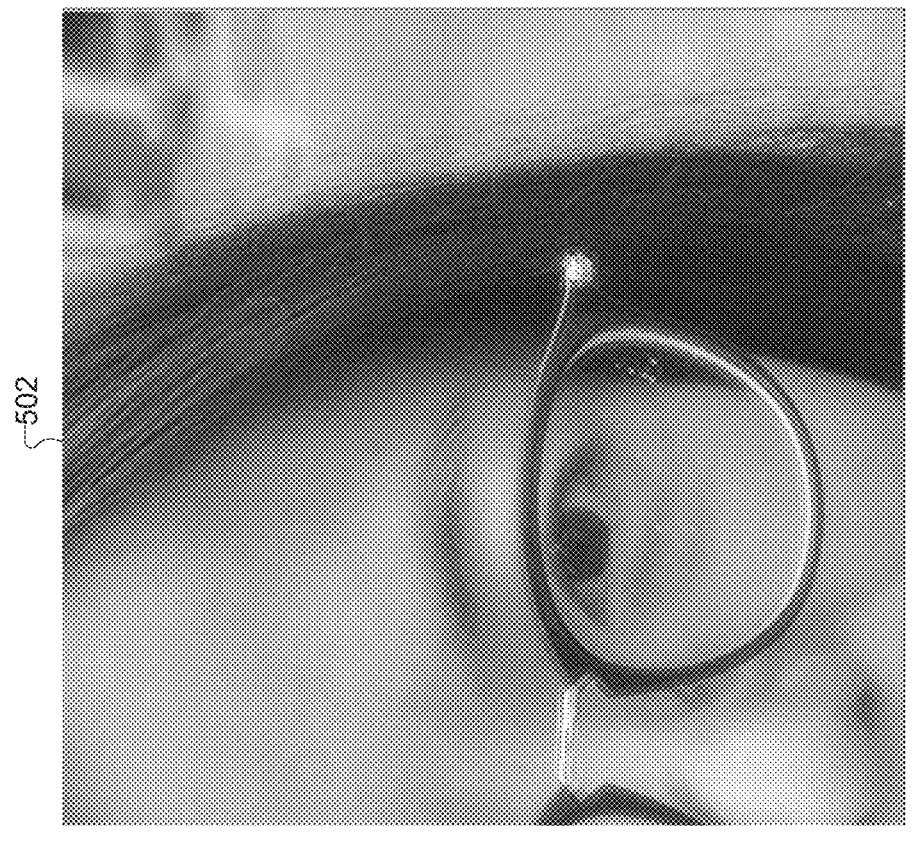
FIGS. 5A and 5B illustrate examples of benefits that can be realized using one or more embodiments of this disclosure.
Figure 5A:
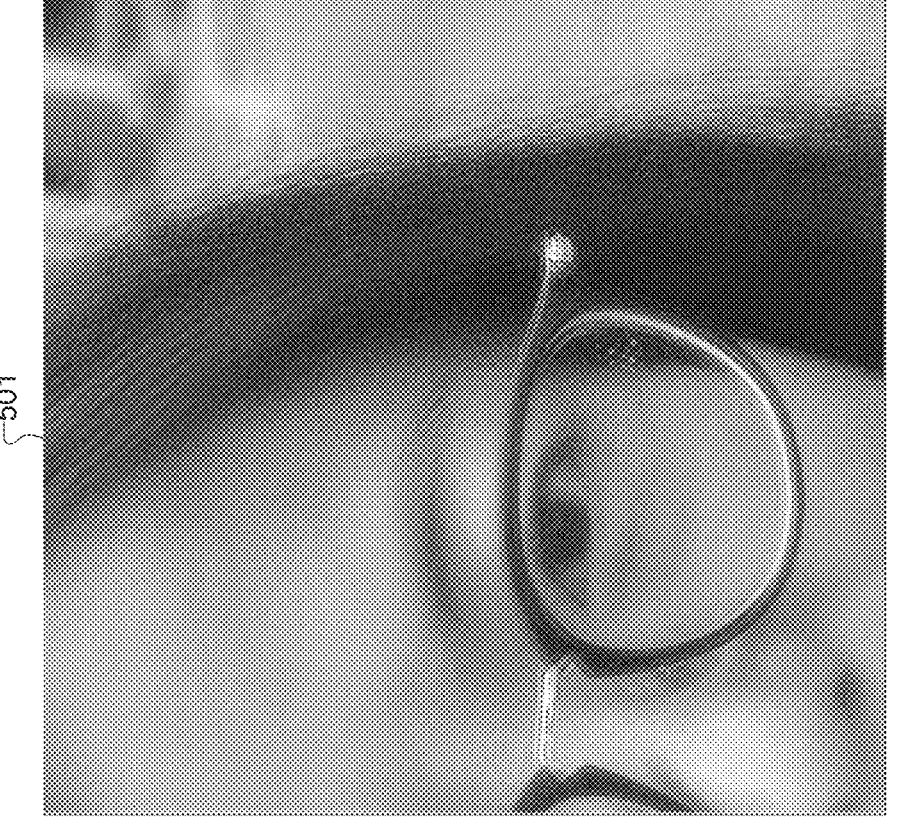

FIGS. 5A and 5B illustrate examples of benefits that can be realized using one or more embodiments of this disclosure. In FIG. 5A, an image 501 is shown that has been generated using a conventional multi-frame registration process. As shown in FIG. 5A, the image 501 includes significant blurring in the foreground, especially in the subject's hair, eye, and eyeglass frames.

In FIG. 5B, a similar image 502 is shown that has been generated using an AI segmentation-based multi-frame registration process as disclosed above (such as is described in FIGS. 2 through 4). The AI segmentation and multi-frame registration allow more frames to be blended into the output image. As evident by FIG. 5B, the image 502 exhibits superior image quality compared to the image 501. In particular, the image 502 is much sharper and more realistic than the image 501, especially in the foreground regions, such as the subject's hair, eye, and eyeglass frames.

Although FIGS. 5A and 5B illustrate examples of benefits that can be realized using one or more embodiments of this disclosure, various changes may be made to FIGS. 5A and 5B. For example, images can be captured of numerous scenes under different lighting conditions and from different distances and angles, and these figures do not limit the scope of this disclosure. These figures are merely meant to illustrate one example of the types of benefits that might be obtainable using the techniques described above.

Figure 6:
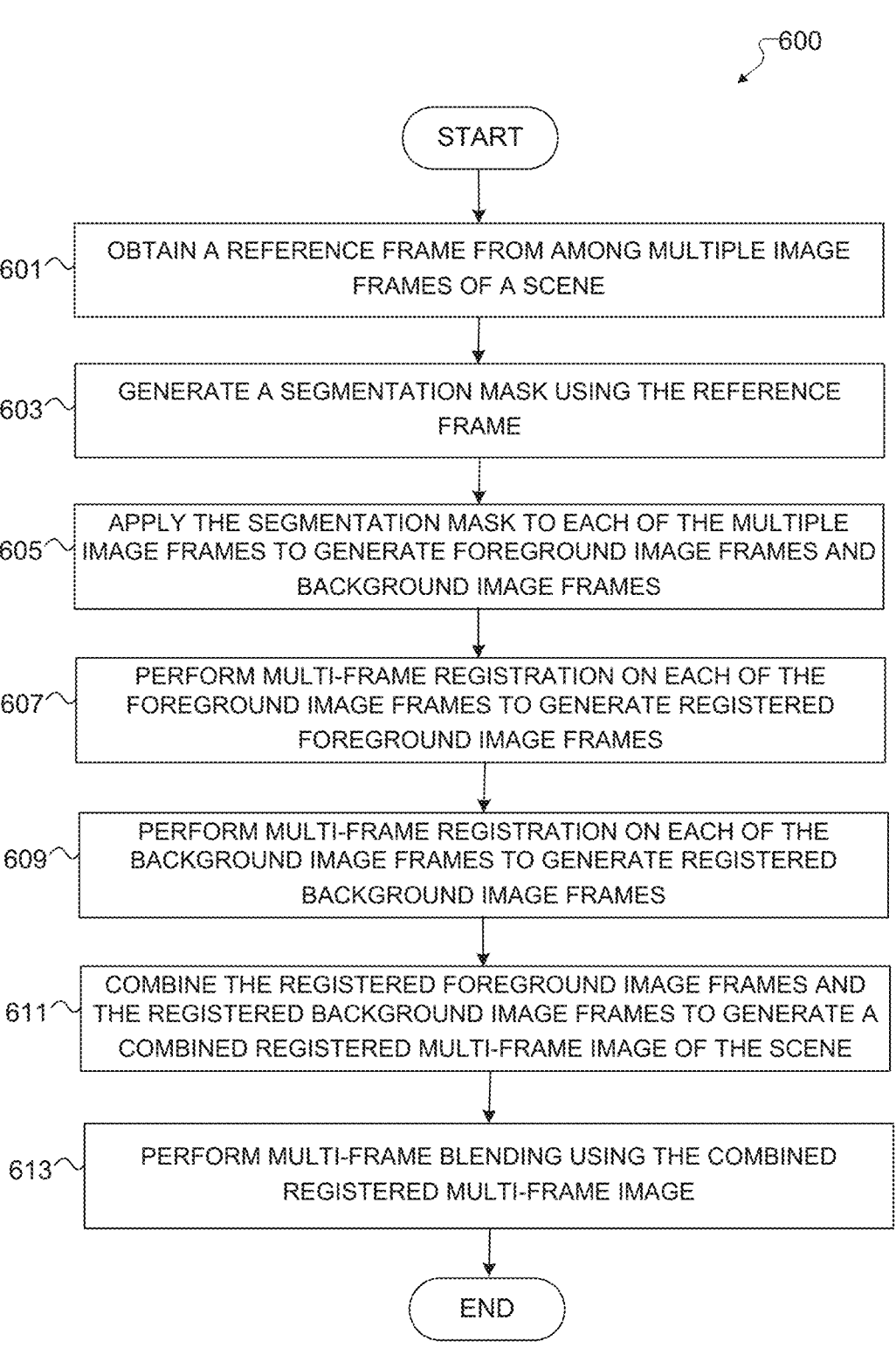
FIG. 6 illustrates an example method for AI segmentation-based registration for multi-frame processing according to this disclosure.

FIG. 6 illustrates an example method 600 for AI segmentation-based registration for multi-frame processing according to this disclosure. For ease of explanation, the method 600 shown in FIG. 6 is described as involving the use of the electronic device 101 shown in FIG. 1 and the multi-frame process 200 shown in FIG. 2. However, the method 600 shown in FIG. 6 could be used with any other suitable electronic device and any suitable process.

As shown in FIG. 6, a reference frame is obtained from among multiple frames of a scene at step 601. This could include, for example, the electronic device 101 obtaining the reference frame 204 from among multiple image frames 202 of a scene. A segmentation mask is generated using the reference frame at step 603. The segmentation mask contains information for separation of foreground and background in the scene. This could include, for example, the electronic device 101 performing the AI segmentation operation 210 to generate the segmentation mask 212. The segmentation mask is applied to each of the multiple image frames to generate foreground image frames and background image frames at step 605. This could include, for example, the electronic device 101 performing the separation operation 220 to generate the foreground image frames 222 and the background image frames 224.

Multi-frame registration is performed on each of the foreground image frames to generate registered foreground image frames at step 607. This could include, for example, the electronic device 101 performing at least some of the operations 310-380 on the foreground image frames 222 to generate registered foreground image frames 222. Multi-frame registration is performed on each of the background image frames to generate registered background image frames at step 609. This could include, for example, the electronic device 101 performing at least some of the operations 311-381 on the background image frames 224 to generate registered background image frames 224.

The registered foreground image frames and the registered background image frames are combined to generate a combined registered multi-frame image of the scene at step 611. This could include, for example, the electronic device 101 performing operation 390 to generate a combined registered multi-frame image 232. Multi-frame blending is performed using the combined registered multi-frame image at step 613. This could include, for example, the electronic device 101 performing the multi-frame blending operation 240 on the combined registered multi-frame image 232 to generate an output image 242.

Although FIG. 6 illustrates one example of a method 600 for AI segmentation-based registration for multi-frame processing, various changes may be made to FIG. 6. For example, while shown as a series of steps, various steps in FIG. 6 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining a reference frame from among multiple image frames of a scene;
   generating a segmentation mask using the reference frame, the segmentation mask containing information for separation of foreground and background in the scene;
   applying the segmentation mask to each of the multiple image frames to generate multiple foreground image frames and multiple background image frames;
   performing multi-frame registration on each of the multiple foreground image frames to the foreground in the reference frame to generate registered foreground image frames by determining a first homography matrix for each of the multiple foreground image frames based on each tile center within the reference frame and matching features in each of the multiple foreground image frames;
   performing multi-frame registration on each of the multiple background image frames to the background in the reference frame to generate registered background image frames by determining a second homography matrix for each of the multiple background image frames based on each tile center within the reference frame and matching features in each of the multiple background image frames; and
   combining the registered foreground image frames and the registered background image frames to generate a combined registered multi-frame image of the scene;
   wherein the combining of the registered foreground image frames and the registered background image frames includes calculating first and second displacement matrices for the registered foreground image frames and the registered background image frames, respectively; and
   wherein the first and second displacement matrices are used to either (i) resize the segmentation mask or (ii) separately warp the registered foreground image frames and the registered background image frames.

2. The method of claim 1, further comprising:
   performing multi-frame blending using the combined registered multi-frame image.

3. The method of claim 1, wherein the displacement matrices are used to map locations in the foreground image frames to the reference frame and locations in the background image frames to the reference frame.

4. The method of claim 1, further comprising:
   warping the registered foreground image frames; and
   warping the registered background image frames.

5. The method of claim 4, wherein the registered foreground image frames and the registered background image frames are combined using a blending operation that combines the warped registered foreground image frames and the warped registered background image frames.

6. The method of claim 1, wherein the segmentation mask is generated using an artificial intelligence (AI) segmentation engine.

7. The method of claim 1, further comprising:
   removing outlier feature points to refine the first homography matrix and the second homography matrix;
   validating an alignment between each of the multiple foreground image frames and the foreground in the reference frame based on the refined first homography matrix; and
   validating an alignment between each of the multiple background image frames and the background in the reference frame based on the refined second homography matrix.

8. An electronic device comprising:
   at least one imaging sensor configured to capture multiple image frames of a scene; and
   at least one processing device configured to:
      obtain a reference frame from among the multiple image frames;
      generate a segmentation mask using the reference frame, the segmentation mask containing information for separation of foreground and background in the scene;
      apply the segmentation mask to each of the multiple image frames to generate multiple foreground image frames and multiple background image frames;

perform multi-frame registration on each of the multiple foreground image frames to the foreground in the reference frame to generate registered foreground image frames by determining a first homography matrix for each of the multiple foreground image frames based on each tile center within the reference frame and matching features in each of the multiple foreground image frames;

perform multi-frame registration on each of the multiple background image frames to the background in the reference frame to generate registered background image frames by determining a second homography matrix for each of the multiple background image frames based on each tile center within the reference frame and matching features in each of the multiple background image frames; and combine the registered foreground image frames and the registered background image frames to generate a combined registered multi-frame image of the scene;

wherein the at least one processing device is configured to combine the registered foreground image frames and the registered background image frames by calculating first and second displacement matrices for the registered foreground image frames and the registered background image frames, respectively; and use the first and second displacement matrices to either (i) resize the segmentation mask or (ii) separately warp the registered foreground image frames and the registered background image frames.

9. The electronic device of claim 8, wherein the at least one processing device is further configured to perform multi-frame blending using the combined registered multi-frame image.

10. The electronic device of claim 8, wherein the at least one processing device is configured to use the displacement matrices to map locations in the foreground image frames to the reference frame and locations in the background image frames to the reference frame.

11. The electronic device of claim 8, wherein the at least one processing device is further configured to warp the registered foreground image frames and warp the registered background image frames.

12. The electronic device of claim 11, wherein, to combine the registered foreground image frames and the registered background image frames, the at least one processing device is configured to use a blending operation that combines the warped registered foreground image frames and the warped registered background image frames.

13. The electronic device of claim 8, wherein, to generate the segmentation mask, the at least one processing device is configured to use an artificial intelligence (AI) segmentation engine.

14. The electronic device of claim 8, wherein the at least one processing device is further configured to:

remove outlier feature points to refine the first homography matrix and the second homography matrix;

validate an alignment between each of the multiple foreground image frames and the foreground in the reference frame based on the refined first homography matrix; and validate an alignment between each of the multiple background image frames and the background in the reference frame based on the refined second homography matrix.

15. A non-transitory machine-readable medium containing instructions that when executed cause at least one processor of an electronic device to:

obtain a reference frame from among multiple image frames of a scene;

generate a segmentation mask using the reference frame, the segmentation mask containing information for separation of foreground and background in the scene;

apply the segmentation mask to each of the multiple image frames to generate multiple foreground image frames and multiple background image frames;

perform multi-frame registration on each of the multiple foreground image frames to the foreground in the reference frame to generate registered foreground image frames by determining a first homography matrix for each of the multiple foreground image frames based on each tile center within the reference frame and matching features in each of the multiple foreground image frames;

perform multi-frame registration on each of the multiple background image frames to the background in the reference frame to generate registered background image frames by determining a second homography matrix for each of the multiple background image frames based on each tile center within the reference frame and matching features in each of the multiple background image frames; and combine the registered foreground image frames and the registered background image frames to generate a combined registered multi-frame image of the scene;

wherein the instructions when executed cause the at least one processor to combine the registered foreground image frames and the registered background image frames by calculating first and second displacement matrices for the registered foreground image frames and the registered background image frames, respectively; and use the first and second displacement matrices to either (i) resize the segmentation mask or (ii) separately warp the registered foreground image frames and the registered background image frames.

16. The non-transitory machine-readable medium of claim 15, further containing instructions that when executed cause the at least one processor to perform multi-frame blending using the combined registered multi-frame image.

17. The non-transitory machine-readable medium of claim 15, wherein the instructions when executed cause the at least one processor to use the displacement matrices to map locations in the foreground image frames to the reference frame and locations in the background image frames to the reference frame.

18. The non-transitory machine-readable medium of claim 15, further containing instructions that when executed cause the at least one processor to warp the registered foreground image frames and warp the registered background image frames.

19. The non-transitory machine-readable medium of claim 18, wherein the instructions that when executed cause the at least one processor to combine the registered foreground image frames and the registered background image frames comprise:

instructions that when executed cause the at least one processor to use a blending operation that combines the warped registered foreground image frames and the warped registered background image frames.

20. The non-transitory machine-readable medium of claim 15, further containing instructions that when executed cause the at least one processor to:

remove outlier feature points to refine the first homography matrix and the second homography matrix;

validate an alignment between each of the multiple fore-
ground image frames and the foreground in the refer-
ence frame based on the refined first homography
matrix; and validate an alignment between each of the multiple back-
ground image frames and the background in the refer-
ence frame based on the refined second homography
matrix.

* * * * *